R. T. COOKE.
BEARING OILER.
APPLICATION FILED OCT. 5, 1918.

1,291,417. Patented Jan. 14, 1919.

WITNESS:
M. H. Fuller
Bess Wiars

INVENTOR.
Richard T. Cooke
BY
Ernest K. Hood
ATTORNEY.

UNITED STATES PATENT OFFICE.

RICHARD T. COOKE, OF INDIANAPOLIS, INDIANA, ASSIGNOR TO NATIONAL REFINING COMPANY, OF CLEVELAND, OHIO, A CORPORATION OF OHIO.

BEARING-OILER.

1,291,417. Specification of Letters Patent. Patented Jan. 14, 1919.

Application filed October 5, 1918. Serial No. 257,082.

*To all whom it may concern:*

Be it known that I, RICHARD T. COOKE, a citizen of the United States, residing at Indianapolis, in the county of Marion and State of Indiana, have invented certain new and useful Improvements in Bearing-Oilers, of which the following is a specification.

The object of my invention is to provide an efficient oiler which will always provide sufficient lubrication for bearings both under normal and abnormal conditions and my invention consists in the combination and arrangements of parts hereinafter described and claimed.

It is well known that if sufficient lubricant is delivered to a bearing at the moment it reaches the over-heating point, it will often cool a bearing and prevent a disastrous burn out.

My invention is shown in one of its forms in the accompanying drawings, of which;

Figure 2:
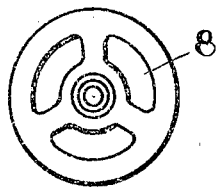
Fig. 2 is a detail plan of a portion thereof.
Figure 1:
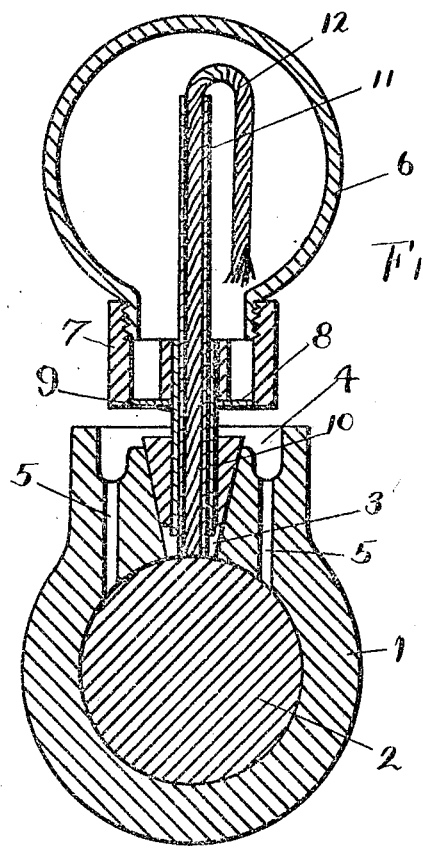
Figure 1 is a cross section.

The numeral 1 represents a shaft bearing designed to carry a shaft 2. Said bearing is provided with the usual oil hole 3 and oil pan 4. Holes 5 are drilled from said pan to the shaft 2, so that oil can flow thereto.

The numeral 6 represents an inverted oil receptacle provided with a screw cap 7 on the lower side thereto. Said cap is provided with a spider shaped lower side 8 which in turn is supported by a tube 9 rigidly secured thereto. This tube 9 carries a slip tapered plug or sleeve 10 adapted to go into oil hole 3.

A slidable tube 11 is mounted inside of tube 9 and carries a wick 12 extending up into the body of the oiler as shown.

This arrangement allows the tube 11 and its wick to drop down on the shaft and lubricate it under normal conditions.

The open parts of spider 8 are filled with a fusible material having a melting point slightly below the danger point of overheating for the bearing.

When a bearing becomes heated to a point approaching danger, the fusible material in spider 8 melts and the entire contents of the oiler is dumped into the oil pan and flows into the bearing, thus caring for the abnormal conditions.

I have shown in the drawings one form of my invention but I do not wish to limit myself to this alone.

I claim as my invention:

1. In an oil cup the combination of a receptacle a stationary tube leading from the bottom of said receptacle; a slidable tube passing through said stationary tube; a wick in said slidable tube and an auxiliary opening in the bottom of said receptacle normally closed with a fusible substance substantially as and for the purpose set forth.

2. In an oil cup the combination of a receptacle, a stationary tube leading from the bottom of said receptacle; a movable bushing on the outside of said tube, a slidable tube passing through said stationary tube; a wick in said slidable tube and an auxiliary opening in the bottom of said receptacle normally closed with a fusible substance substantially as and for the purpose set forth.

3. An oil cup consisting of an inverted receptacle; a removable cap on the lower end of said receptacle; a tube leading from said cap; a slidable tube passing through said stationary tube; a wick in said slidable tube and an auxiliary opening in the bottom of said cap normally closed with a fusible substance substantially as and for the purpose set forth.

RICHARD T. COOKE.

Witnesses:
BESS WIARS,
M. H. FULLER.

Copies of this patent may be obtained for five cents each, by addressing the "Commissioner of Patents, Washington, D. C."